April 11, 1961 F. L. DAVIS 2,978,842
AIR OPERATED VALVE GRINDER
Filed Oct. 27, 1959 4 Sheets-Sheet 1

INVENTOR.
FRANK L. DAVIS
BY
ATTORNEY

INVENTOR.
FRANK L. DAVIS
BY
ATTORNEY

April 11, 1961  F. L. DAVIS  2,978,842
AIR OPERATED VALVE GRINDER
Filed Oct. 27, 1959  4 Sheets-Sheet 3

INVENTOR.
FRANK L. DAVIS
BY
*Philip S. McLean*
ATTORNEY

April 11, 1961 F. L. DAVIS 2,978,842
AIR OPERATED VALVE GRINDER
Filed Oct. 27, 1959 4 Sheets-Sheet 4
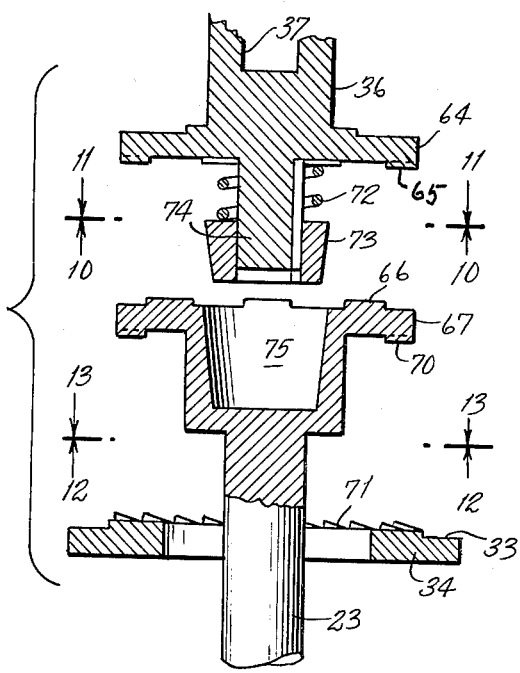
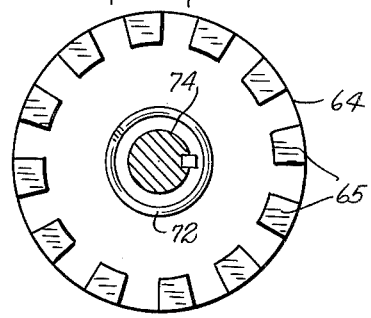
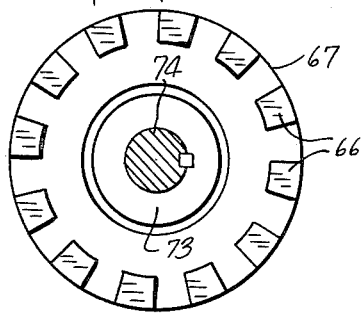
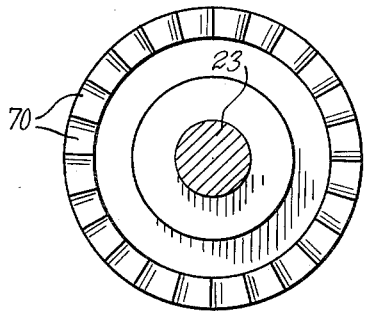
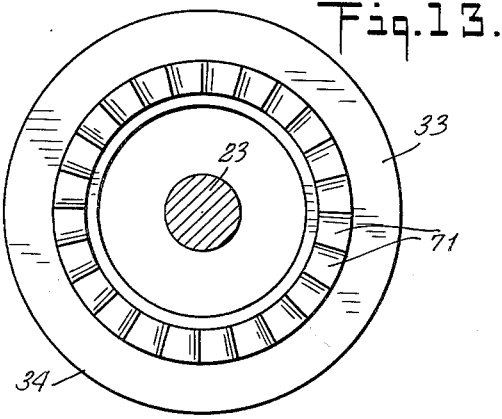
INVENTOR.
FRANK L. DAVIS
BY
ATTORNEY

United States Patent Office 2,978,842
Patented Apr. 11, 1961

2,978,842

AIR OPERATED VALVE GRINDER

Frank L. Davis, 129—07 7th Ave., College Point, N.Y.

Filed Oct. 27, 1959, Ser. No. 848,951

7 Claims. (Cl. 51—29)

The invention herein disclosed relates to motor constructions for grinding the valves of internal combustion engines and the broad general purpose of the invention is to provide a simple practical valve grinder which will be operable by the compressed air, usually available in automobile service stations and repair shops, thus to make possible the use of the valve grinder by simply connecting it with a compressed air outlet.

Special objects of the invention are to provide an air operated valve grinder of small size and light weight, adapted to be held in the hand and be controlled by the hand holding it.

Further special objects of the invention are to construct this valve grinder of relatively few simple parts designed to convert the oscillating movements of a swinging vane into the intermittent or step by step movements required in valve grinding operations.

Other desirable objects attained by the invention and the novel features of construction through which all such purposes are accomplished are set forth and will appear in the course of the following specification.

The drawings accompanying and forming part of this specification illustrate a present practical embodiment of the invention but it will be understood that structure may be modified and changed as regards the immediate illustration, all within the true intent and scope of the invention as hereinafter defined and claimed.

Fig. 1 in the drawings is a side elevation of the complete unit with air connection at the top, control button at the side and valve gripping cup or chuck at the bottom.

Fig. 9 is a broken sectional view of these clutch parts in separated relation.

Figs. 10 and 11 are plane views of the companion clutch disks on the lower end of the vane shaft and the upper end of the grinder shaft looking in the direction of the arrows 10—10 and 11—11 in Fig. 9.

Figs. 12 and 13 are similar views of the companion ratchet teeth on the grinder shaft and the ratchet ring viewed as looking in the direction of the arrows 12—12 and 13—13 respectively of Fig. 9.

Figure 1:
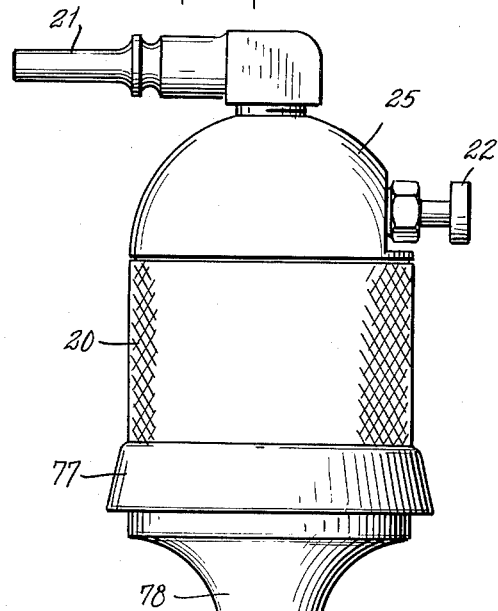
Figure 2:
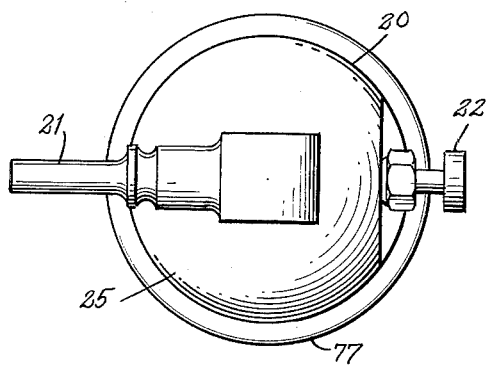
Fig. 2 is a top plan view of the unit.
Figure 4:
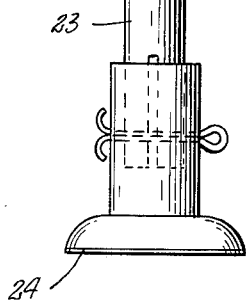
Fig. 4 is a cross sectional view on substantially the plane of line 4—4 of Fig. 3 showing air passage leading from the upper chamber down to the automatic ball valve directing flow to opposite ends of the oscillating vane.
Figure 4:
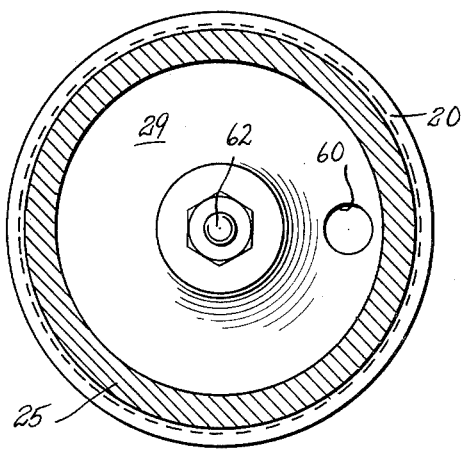

As shown in Figs. 1 and 2 this valve grinder consists of a small casing 20 adapted to be held in the palm of the hand, with an air connection 21 at the top, a push button control 22 at one side and a projecting shaft 23 at the bottom carrying the suction cup or chuck 24 for engagement with the head of the valve at the bottom.

Figure 3:
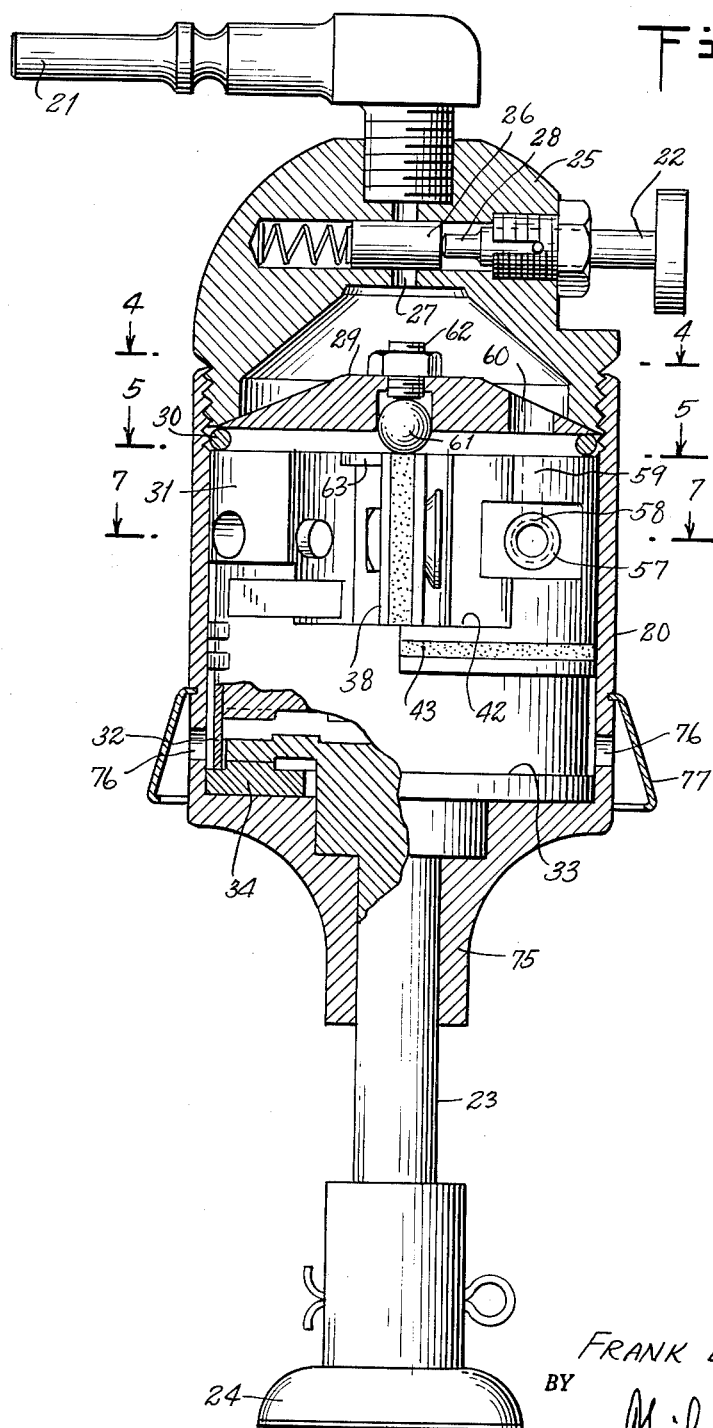
Fig. 3 is a broken vertical sectional view of the device showing the parts on a larger scale.

Fig. 3 shows the casing or body of the tool as made up of a thin shell 20 closed at the top by a screw cap 25, rounded for convenient gripping in the hand and containing a spring closed valve element 26 controlling inlet passage 27 and operable by the stem 28 of the push button 22.

A disk 29 engaged by the inner end of screw cap 25 and bearing on the ring 30 holds a bearing block 31 down in place in the cylindrical casing with the cylindrical flange 32 at the lower end of the same seated on the annular flange portion 33 of the ratchet ring 34 which rests on the bottom of the casing.

The insert or bearing member 31 has a bearing 35 at the top for the shaft 36 which is cross slotted at 37 to carry the vane 38.

Figure 5:
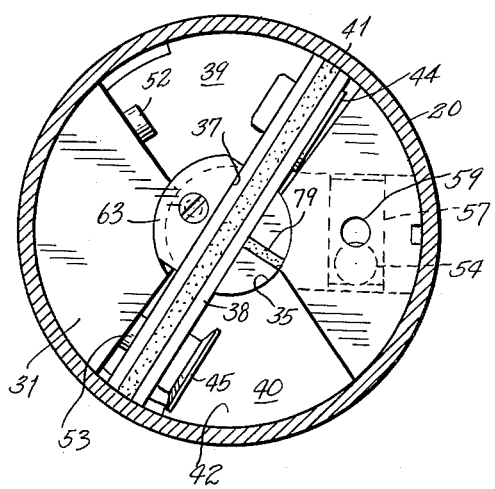
Figs. 5 and 6 are cross sectional views on substantially the plane of line 5—5, Fig. 3, showing the vane at opposite ends of its stroke.
Figure 6:
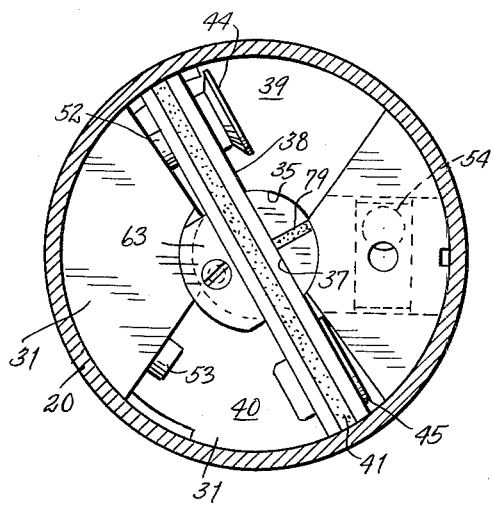
Figure 7:
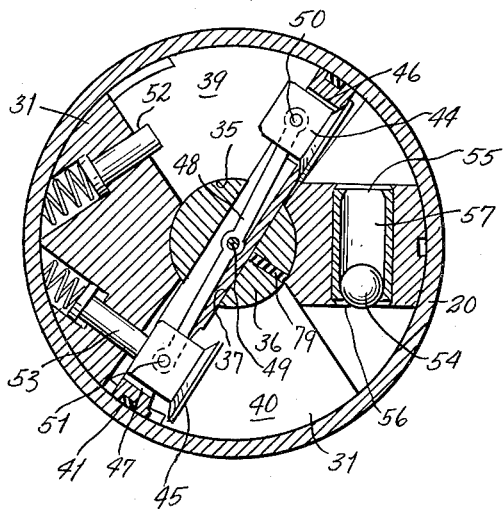
Fig. 7 is a sectional view on substantially the plane of line 7—7 of Fig. 3 showing the connection between the check valves in the opposite ends of the vane and the ball valve for controlling flow to the opposite ends of the vane.
Figure 8:
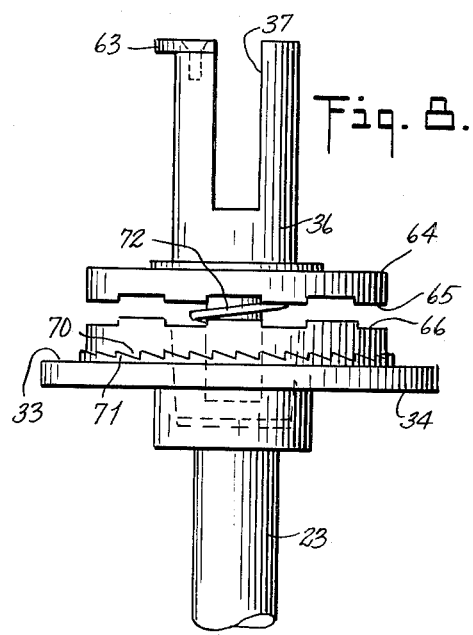
Fig. 8 is a broken side elevation of the clutch mechanism between the upper vane carrying shaft and the lower, chuck or grinder shaft.

As shown more particularly in Figs. 5, 6, 7, the insert has segmental cut-outs 39, 40 in opposite sides of the same to accommodate the swing of the vane and the vane is shown as having a packing strip 41 about the edges of the same to seal the ends of the vane against the inner wall of the casing and the lower edge of the vane against the segmental surfaces 42, Figs. 3 and 5, on the insert block.

This block is shown as having sealing strips 43 at the bottom to seal the lower ends of the segmental chambers 39, 40 in which the vane oscillates.

The reverse oscillating movements of the vane are effected by the provision of check valves closing ports in the active face of the vane at opposite ends of the same and by connecting these valves so that one will be open when the other is closed.

Fig. 7 shows these two check valves 44, 45 controlling ports 46, 47 through opposite end portions of the vane and connected by a rock lever 48 pivoted at 49 at the center of the vane and pivotally connected with the check valves at opposite ends at 50 and 51.

The closed check valve is automatically opened at the end of its travel, valve 44 by a spring pressed bumper 52 and valve 45 by a similar spring pressed bumper 53.

Flow of compressed air to the valve closed ends of the vane is automatically controlled by a ball valve interposed in a supply passage leading to the vane and shown in Fig. 7 as comprising a ball 54 free to roll into engagement with valve seats 55, 56 at opposite ends of a valve tube 57 which, as shown in Fig. 3, is open at the top and intermediate point 58 to a passage 59 in the top of the bearing block in line with or in communication with the supply port 60 in the disk 29 forming a roof over the insert carrying the vane mechanism.

This disk or cover plate is shown as carrying a thrust ball 61 bearing on the central portion of the vane, adjustable by screw 62 and the vane carrying shaft is shown as having a small segmental plate 63 screwed on top of the same and riding over the edge of the bearing block, thus to hold the vane shaft in properly centered relation.

The upper, vane carrying, power shaft 36 is coupled to the lower, driven, grinder shaft 23 by one-way drive oscillating clutch comprising a disk or flange 64 on the lower end of drive shaft 36 having clutch teeth 65 engageable with companion clutch teeth 66 on the disk or flange 67 on the upper end of the driven shaft 23. The latter, as shown in Fig. 9, carries ratchet teeth 70 on the lower face of the same engageable with companion ratchet teeth 71 on the stationary ratchet ring 34, thus to allow forward rotation but prevent reverse rotation of the grinder shaft.

The companion teeth 65 and 66 on the opposing ends of the driving and driven shafts are shown as positive drive jaw clutch teeth engageable to drive in opposite directions but these are held apart for recovery movement of the drive shaft by a spring 72, Fig. 9, interposed between the upper clutch disk 64 and a sleeve 73 on the lower extension 74 of said shaft which seats in a socket 75 provided on the upper end of the driven shaft circumferentially within the lower clutch flange 67.

This combination of spring separated positive jaw clutch between driving and driven shafts and the ratchet clutch teeth between driven shaft and casing enables the oscillating vane under pressure required to keep the chuck engaged with the valve, to impart positive rotary forward grinding movement to the valve and recover for the next forward stroke. The ball valve, as shown in Fig. 7 will automatically direct the actuating pressure toward the check valve closed forward face of the vane, alternating in effect at the end of the stroke in each direction.

The air exhausted at the end of the stroke in each direction passes through the valve ports in the vane downward in back of the vane and out through exhaust ports 76, Fig. 3, in the lower portion of the casing, shielded by a surrounding baffle ring 77.

The lower, grinder shaft 23 is shown solidly supported in a journal extension 78 on the lower end of the housing structure.

The operating parts are concentrically arranged in compact relation to take up small space and enable use of the machine in limited and more or less inaccessible places and to permit application of straight line pressure of the device on the valve being operated on.

The wall of the cylindrical shell may be knurled or roughened as indicated in Fig. 1 to afford a good finger grip and this with the rounded upper end provides a good hand hold for aplying the necessary endwise grinding pressure on the device.

In the swinging movement of the vane in the forward direction the ratchet teeth 70 on the grinder shaft ride forwardly over the stationary ratchet teeth 71, supporting the jaw clutch teeth 66 in driven engagement of the jaw clutch teeth 65 of the power shaft. As the vane is stopped at the forward end of its stroke the ratchet teeth become fully engaged, enabling spring 72 to separate the jaw clutch elements, thus to permit free swing of the vane in the reverse, recovery stroke.

This combination of spring separated jaw clutch between driving and driven shafts and ratchet clutch between driven shaft and casing automatically accomplishes the forward drive of the grinder and the free recovery stroke of the vane motor.

The reversely acting ball valve 54, 55, 56 and reversely acting check valves 44, 45 automatically direct the power flow alternately to opposite ends of the swinging vane and with the check valve opening bumpers 52, 53 serve to effect oscillation of the vane in opposite directions.

The forward side of the vane carrying shaft which is exposed to the double ended chamber in which the vane operates is shown in Figs. 5, 6 and 7 as carrying a packing strip 79 engaging the wall of the bearing in which this shaft operates.

The construction may be modified in various ways. It is contemplated that the spring for effecting separation of the jaw clutch at the end of the forward stroke may be in the form of a disk movably suported on the lower end of the driving shaft and backed up by a bowed spring which will force it downward into engagement with the opposing upper end of the driven shaft. This spring pressed clutch opening plate may be mounted in loose sliding engagement over three or more headed supporting pins or studs on the lower end of the drive shaft.

While described as operating by compressed air it will be appreciated that the machine may be operated hydraulically or by steam or other pressure fluids.

What is claimed is:

1. An air operated valve grinder comprising the combination of a housing containing a vane chamber, a drive shaft journaled in said housing and carrying an oscillating vane operating in said chamber, means for automatically alternately directing actuating fluid to and releasing it from opposite ends of said vane whereby to impart oscillating movement to said drive shaft, a driven shaft journaled concentrically in said housing in end to end relation with said drive shaft, companion jaw clutch elements on the opposing ends of said driving and driven shafts, ratchet teeth on said driven shaft, companion stationary ratchet teeth in said housing engageable by the ratchet teeth on said driven shaft and spring means for automatically effecting the separation of said jaw clutch elements at the end of the forward oscillating movement of said drive shaft, including a collar slidably keyed on the end of said driving shaft and a companion socket for the same in the opposing end of said driven shaft, said collar being held in said socket by said spring.

2. An air operated valve grinder comprising the combination of a housing containing a vane chamber, a drive shaft journaled in said housing and carrying an oscillating vane operating in said chamber, means for automatically alternately directing actuating fluid to and releasing it from opposite ends of said vane whereby to impart oscillating movement to said drive shaft, a driven shaft journaled concentrically in said housing in end to end relation with said drive shaft, companion jaw clutch elements on the opposing ends of said driving and driven shafts, ratchet teeth on said driven shaft, companion stationary ratchet teeth in the said housing engageable by the ratchet teeth on said driven shaft and spring means for automatically effecting the separation of said jaw clutch elements at the end of the forward oscillating movement of said drive shaft, means for holding said drive shaft against longitudinal shifting movement in the housing and said driven shaft being mounted for longitudinal shifting movement in the housing sufficient to effect coupling and uncoupling of said jaw clutch elements and the engagement and disengagement of said relatively movable and stationary ratchet teeth.

3. A valve grinder comprising a housing, an oscillating vane motor within said housing having a drive shaft, a valve grinder shaft journaled in opposed end to end relation to said motor shaft, a positive jaw clutch between said motor shaft and grinder shaft, spring means for effecting separation of said jaw clutch and a ratchet clutch between said grinder shaft and housing, said van motor including a swinging vane having ports through opposite end portions of the same, check valves mounted to open and close said ports, abutments for automatically opening said check valves at the ends of the swinging movements of the vane and means for automatically directing actuating fluid alternately to the valve-closed ends of said swinging vane.

4. The invention according to claim 3 in which said check valves are pivotally connected by a lever pivoted on the motor shaft and connected with said valves to hold one valve closed when the other valve is open.

5. The invention according to claim 3 in which said means for directing actuating fluid comprises a ball valve in the form of a tube having valve seats at opposite ends open to the opposite ends of said vane and a ball confined in said tube for alternate engagement with said valve seats, said tube having a fluid supply opening in the intermediate portion of the same.

6. A valve grinder comprising a housing having a drive shaft journaled in the upper portion of the same and a driven shaft journaled in line therewith in the lower portion of said housing, a jaw clutch between said driving and driven shafts, spring means for opening said jaw clutch, a ratchet clutch between said driven shaft and housing, a vane carried by said drive shaft, said housing having a vane chamber enclosing opposite ends of said vane and means for alternately supplying actuating fluid to and exhausting it from the opposite ends of said vane.

7. A valve grinder comprising a housing having a drive shaft journaled in the upper portion of the same and a driven shaft journaled in line therewith in the lower portion of said housing, a jaw clutch between said driving and driven shafts, spring means for opening said jaw clutch, a ratchet clutch between said driven shaft and housing, a vane carried by said drive shaft, said housing having a vane chamber enclosing opposite ends of said vane and means for alternately supplying actuating fluid to and exhausting it from the opposite ends of said vane including a ball valve for alternately automatically admitting actuating fluid to opposite ends of the vane, check valves controlling passage through opposite ends of the vane and abutments in back of said check valves positioned to alternately open said check valves at the end of the swinging movement of the vane in opposite directions.

References Cited in the file of this patent

UNITED STATES PATENTS

| 2,065,484 | Werder | Dec. 22, 1936 |
| 2,376,746 | Zimmerman | May 22, 1945 |

FOREIGN PATENTS

| 407,481 | Great Britain | Mar. 22, 1934 |